United States Patent [19]

Mueller

[11] Patent Number: 6,107,418

[45] Date of Patent: *Aug. 22, 2000

[54] COMPOSITION FOR COATING SHAPED ARTICLES OR ELASTOMERIC MATERIALS

[75] Inventor: Johann Mueller, Burghausen, Germany

[73] Assignee: Wacker-Chemie GmbH, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/568,071

[22] Filed: Dec. 6, 1995

[30] Foreign Application Priority Data

Dec. 15, 1994 [DE] Germany ............................... 44 44 780

[51] Int. Cl.$^7$ .................................................. C08F 283/00
[52] U.S. Cl. ......................... 525/477; 525/100; 525/104; 525/106; 525/431; 525/446; 528/34; 528/39
[58] Field of Search ..................................... 525/477, 446, 525/431, 100, 104, 106; 528/34, 39

[56] References Cited

U.S. PATENT DOCUMENTS

| | | | |
|---|---|---|---|
| 3,639,155 | 2/1972 | Hartlein et al. . | |
| 4,489,127 | 12/1984 | Gutek et al. . | |
| 5,015,413 | 5/1991 | Nagaoka | 252/511 |
| 5,073,608 | 12/1991 | Ona et al. | 525/477 |
| 5,091,484 | 2/1992 | Colas et al. | 525/477 |
| 5,252,685 | 10/1993 | Arai et al. | 525/477 |
| 5,302,683 | 4/1994 | Weidner et al. | 528/21 |
| 5,306,759 | 4/1994 | Sakagami et al. | 524/379 |
| 5,352,491 | 10/1994 | Cifuentes et al. | 427/387 |
| 5,371,155 | 12/1994 | Kobayashi | 525/477 |
| 5,415,912 | 5/1995 | Ushizaka et al. | 428/40 |

FOREIGN PATENT DOCUMENTS

| | | |
|---|---|---|
| 250682 | 11/1966 | Austria . |
| 0307954 | 9/1988 | European Pat. Off. . |
| 0220804 | 3/1990 | European Pat. Off. . |

OTHER PUBLICATIONS

Derwent Abstract AN 82–62111E

Primary Examiner—Margaret G. Moore
Attorney, Agent, or Firm—Brooks & Kushman P.C.

[57] ABSTRACT

The invention relates to a composition, to a process for its preparation and to a method of coating shaped articles or elastomeric materials, where the composition can be prepared using (1) polymer components selected from the group consisting of
  (A1) polyorganosiloxanes comprising units (T units) of the formula ($R_1Si$—$O_{3/2}$) and optionally, units (M units) of the formula ($R_3Si$—$O_{1/2}$)
  (A2) polyorganosiloxanes comprising units (Q units) of the formula ($Si$—$O_{4/2}$) and, optionally, units (M units) of the formula ($R_3Si$—$O_{1/2}$)
  in which
    R is identical or different and represents unhalogenated or halogenated hydrocarbon radicals having 1 to 18 carbon atom(s) per radical or $OR^1$, where
    $R^1$ is identical or different and represents hydrogen or a monovalent, unsubstituted or substituted hydrocarbon radical having 1 to 8 carbon atom(s),
    with the proviso that there are from 0.01% to 3.0% by weight, preferably from 0.01% to 1% by weight, of Si-bonded radicals $OR^1$
  (B) vinyl chloride-hydroxypropyl acrylate copolymers,
  (C) vinyl acetate-ethylene copolymer,
  (D) polyvinyl chloride,
  (E) polyamide,
  (F) polyester,
  (G) acrylate-polyester copolymers,
  (H) polyamide-polyester copolymers,
  (I) vinyl acetate-polyester copolymers, and
  (J) Monomeric (meth)acrylates, with the proviso that they are copolymerized with Si-bonded (meth) acrylate group-containing silanes,
(2) a silane of the formula $R^3_xSi(OR^2)_{4-x}$, where
  $R^2$ is a monovalent, unsubstituted or substituted hydrocarbon radical,
  $R^3$ is a monovalent organic radical,
  x represents 0 or 1,
(3) optionally, a solvent,
(4) optionally, a catalyst and
(5) optionally, water.

3 Claims, No Drawings

COMPOSITION FOR COATING SHAPED ARTICLES OR ELASTOMERIC MATERIALS

BACKGROUND OF INVENTION

The present invention relates to a composition, to a process for its preparation and to a method of coating shaped articles or elastomeric materials.

FIELD OF INVENTION

It is known that silicone rubber surfaces have high coefficients of static and sliding friction. Silicone rubbers with a Shore A hardness of below 70 in particular exhibit highly blocking properties and are easily soiled.

AT-250682 describes a process for the coating of a base material, in which the base material is coated with an aqueous solution of the hydrolysates of an organosiloxane which has an acyloxy radical, and is cured. In a second step, the prime surface is coated with a polymerizable resin, especially polyester resin. This process serves to increase the strength of compression moldings or laminates.

EP 220 804 describes a glass fabric which has a first layer of a polydiorganosiloxane which contains methyl and phenyl groups in a ratio of 0.25 to 3.7, compared with a coating which has only methyl groups, the glass fabric coated with the polydiorganosiloxane being transparent or translucent. A second layer then consists of a polydimethylsiloxane. A third polyorganosiloxane layer is applied to this second layer.

U.S. Pat. No. 4,489,127 describes coatings for fiberglass roofs, which comprise diorganosiloxanes which contain dimethylsiloxane units and phenylmethyl units and copolymers of $R_3SiO_{1/2}$ in $SiO_{4/2}$ units.

U.S. Pat. No. 3,639,155 describes dirt-repellent organosiloxane coatings which comprise dimethylsiloxane units, phenylmethylsiloxane units and monomethylsiloxane units, and also organosiloxane units which contain Si-bonded acetoxy, alkoxy or ketoxy groups.

A disadvantage of the prior art is that the known coatings, owing to the content of phenyl groups, give off aromatic substances when heated or in the event of fire. Further disadvantages of the prior art are that the coefficient of friction is unchanged or reduced only insignificantly, and that phenyl radicals on the silicon are difficult to attain.

SUMMARY OF INVENTION

The object of the present invention is to improve the known coatings and to provide coatings having improved dirt-repellent properties and a lower coefficient of friction.

The present invention relates to a composition which can be prepared using (1) polymer components selected from the group consisting of
  (A1) polyorganosiloxanes comprising units (T units) of the formula ($R_1Si$—$O_{3/2}$) and optionally, units (M units) of the formula ($R_3Si$—$O_{1/2}$)
  (A2) polyorganosiloxanes comprising units (Q units) of the formula (Si—$O_{4/2}$) and, optionally, units (M units) of the formula ($R_3Si$—$O_{1/2}$)
  in which
    R is identical or different and represents unhalogenated or halogenated hydrocarbon radicals having 1 to 18 carbon atom(s) per radical or $OR^1$, where
    $R^1$ is identical or different and represents hydrogen or a monovalent, unsubstituted or substituted hydrocarbon radical having 1 to 8 carbon atom(s), with the proviso that there are from 0.01% to 3.0% by weight, preferably from 0.01% to 1% by weight, of Si-bonded radicals $OR^1$
  (B) vinyl chloride-hydroxypropyl acrylate copolymers,
  (C) vinyl acetate-ethylene copolymer,
  (D) polyvinyl chloride,
  (E) polyamide,
  (F) polyester,
  (G) acrylate-polyester copolymers,
  (H) polyamide-polyester copolymers,
  (I) vinyl acetate-polyester copolymers, and
  (J) Monomeric (meth)acrylates, with the proviso that they are copolymerized with Si-bonded (meth) acrylate group-containing silanes,
(2) a silane of the formula $R^3_xSi(OR^2)_{4-x}$, where
  $R^2$ is a monovalent, unsubstituted or substituted hydrocarbon radical,
  $R^3$ is a monovalent organic radical,
  x represents 0 or 1,
(3) optionally, a solvent,
(4) optionally, a catalyst and
(5) optionally, water.

Examples of radicals R are preferably alkyl radicals, such as the methyl, ethyl, n-propyl, isopropyl, n-butyl, isobutyl, tert-butyl, n-pentyl, isopentyl, neopentyl and tert-pentyl radical; hexyl radicals, such as the n-hexyl radical; heptyl radicals, such as the n-heptyl radical; octyl radicals, such as the n-octyl radical and iso-octyl radicals such as the 2,2,4-trimethylpentyl radical; nonyl radicals, such as the n-nonyl radical; decyl radicals, such as the n-decyl radical; dodecyl radicals; such as the n-dodecyl radical; octadecyl radicals, such as the n-octadecyl radical; alkenyl radicals, such as the vinyl and the allyl radicals; cycloalkyl radicals, such as cyclopentyl, cyclohexyl, cycloheptyl radicals and methylcyclohexyl radicals.

Examples of substituted radicals R are cyanoalkyl radicals, such as the β-cyanoethyl radical, and halogenated hydrocarbon radicals, for example haloalkyl radicals, such as the 3,3,3-trifluoro-n-propyl radical, the 2,2,2,2',2',2'-hexafluoroisopropyl radical, the heptafluoroisopropyl radical.

On the grounds of greater ease of accessibility, methyl or ethyl radicals are preferred as radical R.

Radical $R^1$ is preferably hydrogen atom and unsubstituted or substituted hydrocarbon radicals having 1 to 8 carbon atom(s), in which context hydrogen and alkyl radicals having 1 to 3 carbon atom(s), especially the methyl, ethyl, and isopropyl radical, are more preferred.

Examples of radicals $R^1$ are the examples given for the radical R which have 1 to 8 carbon atom(s).

Examples of radicals $R^2$ are preferably unsubstituted or substituted hydrocarbon radicals having 1–18 carbon atom (s), more preferably alkyl radicals, such as the methyl, ethyl, n-propyl, isopropyl, n-butyl, isobutyl, tert-butyl, n-pentyl, isopentyl, neopentyl, tert-pentyl radical; hexyl radicals, such as the n-hexyl radical and isohexyl radicals; heptyl radicals, such as the n-heptyl radical and isoheptyl radical; octyl radicals, such as the n-octyl radical and isooctyl radicals, such as the 2,2,4-trimethylpentyl radical. The methyl and ethyl radical is preferred. Examples of hydrocarbon radicals $R^2$ which can be substituted by an ether oxygen atom are the methoxyethyl, the ethoxyethyl, the methoxy-n-propyl and the methoxy-isopropyl radical.

Examples of radicals $R^3$ are preferably unsubstituted or substituted hydrocarbon radicals having 1–18 carbon atom (s), more preferably alkyl radicals, such as the methyl, ethyl, n-propyl, isopropyl, n-butyl, isobutyl, tert-butyl, n-pentyl, isopentyl, neopentyl, tert-pentyl radical; hexyl radicals, such as the n-hexyl radical and isohexyl radicals; heptyl radicals, such as the n-heptyl radical and isoheptyl radical; octyl radicals, such as the n-octyl radical and isooctyl radicals, such as the 2,2,4-trimethylpentyl radical; nonyl radicals, such as the n-nonyl radical and isononyl radicals; decyl radicals, such as the n-decyl radical and isodecyl radicals; dodecyl radicals, such as the n-dodecyl radical and isododecyl radicals; octadecyl radicals, such as the n-octadecyl radical and isooctadecyl radicals; alkenyl radicals, such as the vinyl and the allyl radicals; cycloalkyl radicals, such as cyclopentyl, cyclohexyl, cycloheptyl radicals, and methylcycloheptyl radicals; aryl radicals, such as the phenyl, naphthyl, anthryl and phenanthryl radicals; alkaryl radicals, such as o-, m-, p-tolyl radicals, xylyl radicals, ethylphenyl radicals, o-, m-, p-vinylphenyl radicals and the nonylphenyl radical; and aralkyl radicals, such as the benzyl radical, the α- and the β-phenyl ethyl radical; isocyanoalkyl radicals such as the isocyanopropyl radical, isocyanoethyl radical, isocyanohexyl radical, isocyanooctyl radical, the isocyanopropyl radical being preferred, and (meth)acyloxy radical such as the methacryloxypropyl radical, acryloxypropyl radical, methacryloxyhexyl radical, acryloxyhexyl radical, the methacryloxypropyl radical being preferred.

Examples of halogenated hydrocarbon radicals R are haloalkyl radicals, such as the 3-chloro-n-propyl radical, the 3,3,3-trifluoro-n-propyl radical, the 2,2,2,2',2',2'-hexafluoroisopropyl radical the heptafluoroisopropyl radical, and haloaryl radicals, such as the o-, m- and p-chlorophenyl radical.

In the polyorganosiloxanes (A1) the ratio of M units to T units is from 0 to 1.8:1, preferably from 0.1 to 1.2:1 and more preferably 0.3 to 0.8:1, and in the polyorganosiloxanes (A2) the ratio of M units to Q units is from 0.00 to 2.7:1, preferably from 0.01 to 2.1:1 more preferably 0.1 to 1.8:1.

The polyorganosiloxanes according to the invention form a polymer comprising 2 to 500, preferably 4 to 300 monomer units.

The polymer components (A1) and (A2) can be employed alone or as mixtures or reaction products of the organosiloxane units. Preferred polymer components are those such as resin solution K or resin solution K 0118 from Wacker-Chemie GmbH. These resins can preferably be dissolved in solvents, such as toluene, xylene, acetone, ethyl acetate, ethanol. The solvents are employed in quantities of from 10% to 98% by weight, preferably from 30% to 98% by weight, based on the overall weight of the polymer components.

The polymer components (A1) and (A2) can be employed alone or as mixtures in a ratio of from 1:20 to 20:1, preferably from 1:10 to 10:1.

In addition to the polymer components (A1) and (A2) it is also possible to employ as polymer components (B) vinyl chloride-hydroxypropyl acrylate copolymers. Such products are offered commercially by Vinnolit GmbH under the name Vinnolit E 15/40 A. It is also possible to employ (C) copolymers of vinyl acetate and ethylene as polymer components. By means of the processes known in the literature, copolymers in every desired ratio can be prepared from both monomers.

As further polymer components it is possible to employ, (D) polyvinyl chloride, (E) polyamide, (F) polyester, (G) acrylate-polyester copolymers, (H) polyamide-polyester copolymers or (I) vinyl acetate-polyester copolymers or (J) Monomeric (meth)acrylates, such as methyl methacrylate, butyl methacrylate, which are polymerized in the reaction mixture. The polymer components (A1), (A2), (B) and (C) are preferred, the polymer components (A1) and (A2) are more preferred.

The polymer components are present in the compositions according to the invention in quantities of 2% to 70% by weight. A quantity of 5% to 50% by weight is preferred, a quantity of 10% to 40% by weight is more preferred.

Preferred examples of silanes (2) are methacryloxypropyltrimethoxysilane (trade name Silan GF 31—Wacker-Chemie GmbH), methyltriethoxysilane (trade name Silan M1-triethoxy—Wacker-Chemie GmbH), vinyltriethoxysilane (trade name Silan GF 56–Wacker-Chemie GmbH), tetraethoxysilane (trade name TES 28—Wacker-Chemie GmbH), mixtures of low molecular weight hydrolysis products of tetraethoxysilane (trade name TES 40—Wacker-Chemie GmbH), methyltrimethoxysilane (trade name M1 trimethoxy—Wacker-Chemie GmbH), isocyanatopropyl trimethoxysilane (trade name Silan Y 9030 UCC).

The silanes are present in quantities of 0.1% to 20% by weight, preferably of 0.5% to 10% by weight.

The polymer components are employed with the silanes (2) or mixtures thereof in the ratio of 100:1 to 100:30, more preferably from 100:2 to 100:20.

The compositions are preferably prepared in organic solvents, such as tetrahydrofuran, toluene, acetone, naphtha, benzine, methyl ethyl ketone, xylene, butyl alcohol, ethyl acetate, isopropyl acetate, isopropanol.

Organic solvents are present in quantities of from 10% to 90% by weight, preferred are 30% to 85% by weight.

The compositions are mixed if desired with condensation catalysts, such as preferably organotin compounds or organozirconium compounds such as, preferably, zirconium butylate, dibutyltin dilaurate, dibutyltin oxide, dioctyltin dilaurate, dibutyltin diacetate.

Preferred among these condensation catalysts are dibutyltin dilaurate, dibutyltin acetate, zirconium butylate.

The condensation catalysts are present in quantitites of between 0% to 10% by weight. Preferred quantities are 0% to 5% by weight, more preferred quantities are 0% to 2% by weight.

A preferred source of free radicals, which are preferably employed in the polymer component (J), are peroxides, especially organic peroxides. Examples of such organic peroxides are peroxyketal, i.e., 1,1-bis(tertbutylperoxy)-3,3,5-trimethylcyclohexane, 2,2-bis(tertbutylperoxy)butane and the like, diacyl peroxides, such as acetyl peroxide, isobutyl peroxide, benzoyl peroxide and the like, dialkyl peroxides, such as di-tert-butyl peroxide, tertbutyl cumyl peroxide, dicumyl peroxide, 2,5-dimethyl-2,5-di(tertbutylperoxy) hexane t-butyl perethylhexanoates and the like and peresters, such as tert-butyl peroxyisopropyl carbonate. Preference is given to t-butyl perethylhexanoate (trade name Peroxan PO) Interox TBPIN.

Peroxides are preferably used in quantities of from 0% to 5% by weight, in particular from 0% to 3% by weight, based on the weight of compound employed in the process according to the invention.

Optionally, water can also be added in quantities of 0% to 20% by weight, preferably 0% to 10% by weight.

The compositions consist either of silicon resins which are mixed with functional silanes and hydrolysed in organic solvents or of organic (co)polymers which are copolymerized with functional silanes.

The invention further relates to a process for the preparation of a composition using (1) polymer components selected from the group consisting of (A1) polyorganosiloxanes comprising units (T units) of the formula ($R_1Si$—$O_{3/2}$) and optionally, units (M units) of the formula ($R_3Si$—$O_{1/2}$)

(A2) polyorganosiloxanes comprising units (Q units) of the formula (Si—$O_{4/2}$) and, optionally, units (M units) of the formula ($R_3$Si—$O_{1/2}$) in which R is identical or different and represents unhalogenated or halogenated hydrocarbon radicals having 1 to 18 carbon atom(s) per radical or $OR^1$, where $R^1$ is identical or different and represents hydrogen or a monovalent, unsubstitued or substituted hydrocarbon radical having 1 to 8 carbon atom(s), with the proviso that there are from 0.01% to 3.0% by weight of Si-bonded radicals $OR^1$ (B) vinyl chloride-hydroxypropyl acrylate copolymers, (C) vinyl acetate-ethylene copolymer, (D) polyvinyl chloride, (E) polyamide, (F) polyester, (G) acrylate-polyester copolymers, (H) polyamide-polyester copolymers, (I) vinyl acetate-polyester copolymers, and (J) Monomeric (meth)acrylates, with the proviso that they are copolymerized with Si-bonded (meth) acrylate group-containing silanes, (2) a silane of the formula $R^3_x Si(OR^2)_{4-x}$, where $R^2$ is a monovalent, unsubstituted or substituted hydrocarbon radical, $R^3$ is a monovalent organic radical, x represents 0 or 1, (3) optionally, solvent, (4) optionally, catalyst and (5) optionally, water.

Examples of R, $R^1$, $R^2$ and $R^3$ are the examples mentioned above.

The preparation of the compositions according to the invention can take place in stirring and mixing units as are conventional in the chemical industry. The units should be capable of being set at temperatures in the range from −10° C. to +150° C. and should be adjustable in their temperature. Owing to the use of organic solvents, protection against explosion is essential.

Compositions are prepared by simple, thorough mixing of the individual components at temperatures which correspond to the ambient room temperature. It is also possible, however, to carry out reactions such as polymerization, condensation or reaction at reactive groups. This requires thermal monitoring of the reaction events. Such processes are carried out between 0° C. and 150° C. Preferred temperatures are between 10° C. and 120° C. For the sake of simplicity the compositions are prepared at normal atmospheric pressure. The preparation can also take place, however, at over pressure up to 20 bar or in vacuum down to 20 mbar.

The invention additionally relates to a shaped article or elastomer which is coated with a composition according to the invention.

The compositions according to the invention are used as protective coatings for elastomeric shaped articles or as topcoats for films, metal parts, woven fabrics, knitted fabrics, nonwovens of synthetic fibres natural fibres or mineral fibres, which are coated with elastomeric materials. Examples thereof are injection molded or extruded articles of elastomeric materials, such as natural rubber, nitrile rubber, butyl rubber or silicone rubber. Textile substrates coated with elastomeric materials, such as conveyor belts, compensators, protective clothing, electrical insulating tubes, electric insulating mats, coated textiles which can be used for textile structures, for example tents, covers, tarpaulins, exhibit, after treatment according to the invention with the topcoats according to the invention, mar-resistant, dirt-repellent surfaces having a reduced coefficient of friction with respect to themselves and to other materials. As base material, dimethylsilicone rubber is preferably used and not phenylmethylsilicone rubber.

The invention additionally relates to a method of coating shaped articles or elastomers with the composition according to the invention.

The compositions can be applied by spraying, brushing, knife-coating, with rollers, by tampon printing, by screen printing, dipping, or similar techniques. They enter into a firm bond with customary silicone rubber surfaces. Full curing takes place by evaporation of the solvent followed by poly-condensation. The curing process can be thermally accelerated.

The surfaces treated with the topcoats according to the invention are dirt-repellent, mar-resistant and have reduced coefficients of friction with respect to themselves and to other materials, such as glass, metal, plastics, fabrics, etc.

It is usual to treat surfaces of silicone rubber mouldings, injection mouldings, insulating tubes, medical articles, silicone rubber-coated woven materials, non-wovens, felts, films or papers with the topcoats according to the invention.

Important properties of the base material, such as tensile strength, extension, elasticity, tear propagation resistance, resistance to heat and cold, to chemicals or light, are not affected by the surface treatment.

Advantages of the composition according to the invention are that the compositions can also be applied to silicone rubber molding, injection molding, insulating tubes, etc. Application is therefore not limited to coated fabrics alone. The compositions according to the invention consist not only of pure silicone resins but also of copolymers and silicone components. This makes it possible to obtain a plurality of properties, such as dirt repellence, mar resistance and reduced frictional resistance, with only one topcoat. The topcoats do not cause stiffening of the base materials, as is the case with the known methods. This is a significant advantage in particular in the area of coated textiles.

The topcoat can be applied in only one operation. Together with the base coating operation, therefore, only two operations are necessary. In the case of coated woven fabrics, knitted fabrics or felts it is possible to use customary commercial liquid silicone rubbers as basecoat. Processes are known which, through the addition of adhesion promoters, make it possible to obtain sufficient adhesion in this operation without a primer.

EXAMPLE 1

700 kg of a silicone resin solution K Toluol (commercial product of Wacker-Chemie GmbH) and 200 kg of silicone resin solution K 0118 (commercial product of Wacker-Chemie GmbH) are placed in a stirrer with distillation attachment and thoroughly mixed. With continual stirring, 324 kg of toluene are distilled off by heating at atmospheric pressure.

The unit and its contents are cooled to room temperature, and 108 kg of methyltriethoxysilane (trade name M1-Triethoxysilan from Wacker-Chemie GmbH), 54 kg of tetraethoxysilane (trade name TES 28 from Wacker-Chemie GmbH), 54 kg of vinyltriethoxysilane (trade name Silan GF 56 from Wacker-Chemie GmbH) and 5 kg of zirconium butylate in that order are added with stirring.

The mixture is stirred at room temperature for 1 hour and then 900 kg of acetone and 44 kg of water are added with stirring. After stirring at room temperature for an additional 2 hours, the product is dispensed into appropriate drums. The clear, colorless liquid has a viscosity of about 1.5 mPa·s and a solids content of about 28%.

EXAMPLE 1a

A polyester fabric which has been coated with Elastosil LR 6250 F (commercial product of Wacker-Chemie GmbH) is coated with the solution from Example 1 using a doctor knife, the solvent is evaporated off at room temperature in 5 min., then the fabric is dried at 150° C. for 5 min. The coating weight of the topcoat is about 40 g/m$^2$.

EXAMPLE 1b

In a soiling test with carbon black, the fabric provided with the topcoat according to 1a shows a markedly reduced uptake of dirt. When an absorbent paper soiled with carbon black is drawn over the coating fabric and the uptake of dirt is determined gravimetrically, the uptake of dirt is found to be reduced by a factor of 8.

1 g of carbon black per m$^2$ are applied to an absorbent paper. This carbon black-soiled paper is drawn over the shaped article which is to be tested for its uptake of dirt. The dirt uptake of the shaped article is determined gravimetrically. A fabric prepared as described in 1a shows a dirt uptake of 0.02 g/m$^2$. The comparison value without topcoat is 0.16 g/m$^2$.

EXAMPLE 1c

The fabric coated with Elastosil LR 6250 F is placed coating on coating. A coefficient of friction of 1.4 is measured. The modified fabric from Example 1a shows a coefficient of friction of 0.6 in the same test. The coefficient of friction of the polyester fabric coated with Elastosil LR 6250 F against the uncoated reverse side of the fabric is 0.9. The laminate modified according to Example 1a has a coefficient of friction of 0.55. The coefficient of friction against stainless steel is 0.8 without a topcoat and 0.58 with topcoat.

The coefficients of friction against glass are 1.3 without and 0.7 with topcoat. Coating as described in Example 1a.

EXAMPLE 2

94 kg of methyl methacrylate, 94 kg of butyl methacrylate and 313 kg of toluene are placed in a stirrer unit which is fitted with a distillation facility, which is suitable for separating azeotropically discharged water. By heating the mixture to 105° C., water present is removed azeotropically. When water is no longer discharged from the mixture, the latter is cooled to 30° C., and 21 kg of Silan GF 31 (commercial product of Wacker-Chemie GmbH) and 2.1 kg of tert-butyl per-ethyl hexanoate are added. The reaction mixture is heated at reflux, a marked reaction commending at about 100° C. The mixture is held at reflux for 8 hours and cooled to 30° C. 15.8 kg of n-butanol and 10.5 kg of Silan M1-Trimethoxy (commercial product of Wacker-Chemie GmbH) are mixed in with stirring. After stirring for 30 minutes, 720 kg of isopropanol and 180 kg of benzine having a boiling range of 120° C. to 140° C. are added. Stirring is continued for 30 min, The mixture is discharged over a filter.

A clear, colorless solution is obtained with a viscosity of 8 mPa·s and a solids content of 14% by weight.

EXAMPLE 2a

A polyester fabric which has been coated with Elastosil LR 6250 F (commercial product of Wacker-Chemie GmbH) is coated using a brush with the solution from Example 2; the solvent is evaporated off at room temperature in 5 min. and the fabric is then dried at 150° C. for 5 min. The coating weight of the topcoat is about 70 g/m$^2$.

EXAMPLE 2b

In a soiling test with carbon black, the fabric provided according to 2a with the topcoat exhibits a markedly reduced uptake of dirt. If a carbon black-soiled, absorbent paper is drawn over the coated fabric and the uptake of dirt is determined gravimetrically, the uptake of dirt is found to be reduced by a factor of 6.

The uptake of dirt is carried out as described in Example 1b. Uptake of dirt without topcoat is 0.19 g/m$^2$. Uptake of dirt with topcoat from Example 2 is 0.03 g/m$^2$.

EXAMPLE 2c

On the fabric coated with Elastosil LR 6250 F, coating is placed on coating. A coefficient of friction of 1.4 is measured. The modified fabric from Example 2a shows a coefficient of friction of 0.8 in the same test. The coefficient of friction of the polyester fabric coated with Elastosil LR 6250 F against the uncoated reverse side of the fabric is 0.9. The laminate modified according to Example 2a has a coefficient of friction of 0.65.

The coefficients of friction against stainless steel are 0.8 without and 0.52 with topcoat.

The coefficients of friction against glass are 1.3 without and 0.77 with topcoat. Coating as described in Example 2a.

EXAMPLE 3

47.8 kg of benzine (boiling range 140° C. to 150° C.), 102.6 kg of methyl ethyl ketone, 236.2 kg of xylene, 9.9 kg of n-butanol and 60 kg of tetrahydrofuran are placed in a unit fitted with a dissolver disc, and 52 kg of Vinnol E 15/40 A (commercial product of Wacker-Chemie GmbH) are dissolved in this solvent mixture with vigorous mixing. 0.5 kg of isocyanopropyltriethoxysilane are added and the mixture is boiled at reflux (about 64° C.) for one hour. The mixture is cooled to 30° C., and 50 kg of tetrahydrofuran, 350 kg of toluene and 1000 kg of acetone are added. Intensive mixing is carried out for 30 minutes. The clear, colorless product has a viscosity of 11 mPa·s and a solids content of about 2.8% by weight.

EXAMPLE 3a

A polyester fabric which has been coated with Elastosil LR 6250 F (commercial product of Wacker-Chemie GmbH) is dipped in the solution from Example 3. After removal from the dipping bath, the solvent is evaporated off at room temperature in 5 min. and the fabric is then dried at 150° C. for 5 min. The coating weight of the top coat is about 20 g/m$^2$.

EXAMPLES 3b

In a soiling test with carbon black, the fabric provided according to 3a with the topcoat shows a markedly reduced uptake of dirt. If a carbon black-soiled, absorbent paper is drawn over the coated fabric and the uptake of dirt is determined gravimetrically, then the uptake of dirt is found to be reduced by a factor of 9.

Uptake of dirt is carried out as described in Example 1b. Uptake of dirt without topcoat is 0.17 g/m$^2$. Uptake of dirt with topcoat from Example 3 is 0.019 g/m$^2$.

EXAMPLE 3c

On the fabric coated with Elastosil LR 6250 F, coating is placed on coating. A coefficient of friction of 1.4 is measured. The modified fabric from Example 3a shows a coefficient of friction of 0.7 in the same test. The coefficient of friction of the polyester fabric coated with Elastosil LR 6250 F against the uncoated reverse side of the fabric is 0.9. The laminate modified according to Example 3a has a coefficient of friction of 0.48. The coefficients of friction against stainless steel are 0.8 without and 0.62 with topcoat.

The coefficients of friction against glass are 1.3 without and 0.52 with topcoat. Coating as described in Example 3a.

Soiling Test

An absorbent crepe paper is loaded with 1 g of carbon black per $m^2$ and is applied with cyclical movements to the fabric coated in accordance with the invention and a comparison fabric. In general, the fabric coated in accordance with the invention took up from 0.01 $g/m^2$ to 0.05 $g/m^2$ of carbon black, while the comparison fabric coated not in accordance with the invention took up from 0.1 $g/m^2$ to 0.3 $g/m^2$.

Determination of the Coefficient of Friction

The coefficient of friction is determined in accordance with ASTM Standard D-1894 with a slip/peel tester model SP-103 from the company Instrumentos Inc., Cleveland, Ohio.

What is claimed is:

1. A composition liquid at room temperature, consisting of the reaction product of,
   (1) a polymer component selected from the group consisting of
      (A1) polyorganosiloxanes comprising units (T units) of the formula ($R_1Si$—$O_{3/2}$) and optionally, units (M units) of the formula ($R_3Si$—$O_{1/2}$),
      (A2) polyorganosiloxanes comprising units (Q units) of the formula ($Si$—$O_{4/2}$) and, optionally, units (M units) of the formula ($R_3Si$—$O_{1/2}$),
      and mixtures thereof in which
      R is identical or different and represents non-halogenated hydrocarbon radicals having 1 to 18 carbon atom(s) per radical or $OR^1$, where
      $R^1$ is identical or different and represents hydrogen or a monovalent, unsubstituted or substituted hydrocarbon radical having 1 to 8 carbon atom(s), with the proviso that A1 and A2 contain from 0.01% to 3.0% by weight, of Si-bonded radicals $OR^1$, and
      optionally one or more of (B) through (J):
         (B) vinyl chloride-hydroxypropyl acrylate copolymers,
         (C) vinyl acetate-ethylene copolymer,
         (D) polyvinyl chloride
         (E) polyamide,
         (F) polyester,
         (G) acrylate-polyester copolymers,
         (H) polyamide-polyester copolymers,
         (I) vinyl acetate-polyester copolymer, and
         (J) monomeric (meth)acrylates, with the proviso that they are copolymerized with Si-bonded (meth) acrylate group-containing silanes,
   (2) a silane of the formula $R^3{}_xSi(OR^2)_{4-x}$, where
      $R^2$ is a monovalent, unsubstituted or substituted hydrocarbon radical,
      $R^3$ is a monovalent, substituted or unsubstituted alkyl, alkenyl, or cycloalkyl radical,
      x represents 0 or 1,
   (3) from about 10% to 90% by weight based on the total weight of the composition of one or more organic solvents,
   (4) optionally, a catalyst and
   (5) optionally, water,
   wherein polyorganosiloxane (A1) contains M units and wherein the ratio of M units to T units is from about 0.1:1 to about 1.2:1; and
   wherein polyorganosiloxane (A2) contains M units and wherein the ratio of M units to Q units is from about 0.01:1 to about 2.1:1.

2. A composition liquid at room temperature, consisting of the reaction product of,
   (1) a polymer component selected from the group consisting of
      (A1) polyorganosiloxanes comprising units (T units) of the formula ($R_1Si$—$O_{3/2}$) and optionally, units (M units) of the formula ($R_3Si$—$O_{1/2}$),
      (A2) polyorganosiloxanes comprising units (Q units) of the formula ($Si$—$O_{4/2}$) and, optionally, units (M units) of the formula ($R_3Si$—$O_{1/2}$),
      and mixtures thereof in which
      R is identical or different and represents alkyl radicals having 1 to 18 carbon atom(s) per radical or $OR^1$, where
      $R^1$ is identical or different and represents hydrogen or a monovalent, unsubstituted or substituted hydrocarbon radicals having 1 to 8 carbon atom(s), with the proviso that A1 and A2 contain from 0.01% to 3.0% by weight, of Si-bonded radicals $OR^1$, and
      optionally one or more of (B) through (I):
         (B) vinyl chloride-hydroxypropyl acrylate copolymers,
         (C) vinyl acetate-ethylene copolymer,
         (D) polyvinyl chloride,
         (E) polyamide,
         (F) polyester,
         (G) acrylate-polyester copolymers,
         (H) polyamide-polyester copolymers,
         (I) vinyl acetate-polyester copolymer, and
   (2) a silane of the formula $R^3{}_xSi(OR^2)_{4-x}$, where
      $R^2$ is a monovalent, unsubstituted or substituted hydrocarbon radical,
      $R^3$ is a monovalent, substituted or unsubstituted alkyl, alkenyl, or cycloalkyl radical,
      x represents 0 or 1,
   (3) from about 10% to about 90% by weight based on the total weight of the composition of one or more organic solvents,
   (4) optionally, a catalyst and
   (5) optionally, water,
   wherein polyorganosiloxane (A1) contains M units and wherein the ratio of M units to T units is from about 0.1:1 to about 1.2:1; and
   wherein polyorganosiloxane (A2) contains M units and wherein the ratio of M units to Q units is from about 0.01:1 to about 2.1:1.

3. A composition consisting of the reaction product of,
   (1) a polymer component selected from the group consisting of
      (A1) polyorganosiloxanes comprising units (T units) of the formula ($R_1Si$—$O_{3/2}$) and optionally, units (M units) of the formula ($R_3Si$—$O_{1/2}$), (A2) polyorganosiloxanes comprising units (Q units) of the formula ($Si$—$O_{4/2}$) and, optionally, units (M units) of the formula ($R_3Si$—$O_{1/2}$) and mixtures thereof in which R is identical or different and represents non-halogenated hydrocarbon radicals having 1 to 18 carbon atom(s) per radical or $OR^1$, where $R^1$ is identical or different and represents hydrogen or a monovalent, unsubstituted or substituted hydrocarbon radical having 1 to 8 carbon atom(s), with the proviso that A1 and A2 contain from 0.01% to 3.0% by weight, of Si-bonded radicals $OR^1$, (2) a silane of the formula $R^3_xSi(OR^2)_{4-x}$, where $R^2$ is a monovalent, unsubstituted or substituted hydrocarbon radical, $R^3$ is a monovalent, substituted or unsubstituted alkyl, alkenyl, or cycloalkyl radical, x represents 0 or 1, (3) about 10% to 90% by weight based on the total weight of the composition of one or more organic solvents, (4) optionally, a catalyst and (5) optionally, water, wherein polyorganosiloxane (A1) contains M units and wherein the ratio of M units to T units is from about 0.1:1 to about 1.2:1; and wherein polyorganosiloxane (A2) contains M units and wherein the ratio of M units to Q units is from about 0.01:1 to about 2.1:1.

* * * * *